United States Patent Office 3,530,182
Patented Sept. 22, 1970

3,530,182
FORMAMIDE PRODUCTION
Peter Haynes, Oakland, Calif., Josef F. Kohnle, Ludwigshafen-Gartenstadt, Germany, and Lynn H. Slaugh, Lafayette, Calif., assignors to Shell Oil Company, New York, N.Y., a corporation of Delaware
No Drawing. Filed Dec. 26, 1967, Ser. No. 693,111
Int. Cl. C07c 103/34
U.S. Cl. 260—561         10 Claims

ABSTRACT OF THE DISCLOSURE

Hydrocarbon formamides are prepared by intimately contacting carbon dioxide, hydrogen and primary or secondary amines in the presence of certain halogen-containing transition metal compounds.

BACKGROUND OF THE INVENTION

Field of the invention

Carbon monoxide is a useful organic compound of established utility in many industrial processes such as the Fischer-Tropsch and the "OXO" processes. One practical method of producing carbon monoxide is by the reduction of carbon dioxide with carbon. Another potentially more practical method is the catalytic hydrogenation of carbon dioxide as illustrated by the following equation:

$$CO_2 + H_2 \rightleftharpoons CO + H_2O$$

However, this reaction typically requires high temperatures and pressures and invariably produces other reduction by-products such as formaldehyde, methane, ethane, methanol and the like. Moreover, carbon monoxide is extremely toxic and requires the use of elaborate safety precautions, particularly when high pressures are utilized. In view of the toxicity of carbon monoxide and the difficulty of preparing it, it would be advantageous to utilize the more easily obtained carbon dioxide in place of carbon monoxide in certain applications in which carbon monoxide is employed.

Description of the prior act

The preparation of hydrocarbon formamides from the corresponding primary or secondary amines is well known. One method involves the contacting of amines with carbon monoxide in the presence of certain metal compounds. However, this reaction requires the application of carbon monoxide pressures of the order of— 300 atmospheres or above. Pressures of this order require the use of special and expensive high pressure equipment a well as the use of elaborate safety precautions in operation due to the toxicity of carbon monoxide.

SUMMARY OF THE INVENTION

It has now been found that hydrocarbon formamides are prepared by the reaction of hydrogen, primary or secondary amines and carbon dioxide in the presence of certain halogen-containing transition metal compounds as catalysts. The process of the invention apparently does not involve hydrogenation of the carbon dioxide reactant to carbon monoxide and consequently does not necessitate the presence of extremely toxic carbon monoxide or the use of the extremely high pressures required for preparation of hydrocarbon formamides from carbon monoxide and amines. By way of illustration, dimethylamine, carbon dioxide and hydrogen react under mild conditions in the presence of zinc bromide to produce N,N-dimethylformamide in essentially 100% selectivity based on converted dimethylamine.

*The metal catalyst.*—The metal compounds employed in the process of the invention as catalyst comprise certain halogen-containing compounds of transition metals. Although compounds of a variety of halogen-containing transition metals such as the noble metals, e.g., ruthenium, rhodium, iridium, gold or silver are operable as the catalyst component, preferred catalysts are halogen-containing compounds of copper, zinc, cadmium, palladium and platinum. Suitable compounds of these preferred metals are represented by the following Formulas I and II:

$$MX_n \qquad (I)$$

$$L_{4-n}MX_n \qquad (II)$$

wherein M is copper, zinc, cadmium, palladium or platinum, X is halogen, L is an organic ligand as will be defined and $n$ is a whole number from 1 to 2 inclusive. The halogen substituents are suitably halogen of atomic number 9 to 53 inclusive, i.e., fluorine, chlorine, bromine or iodine, but best results are obtained when the halogen ligands are halogen of atomic number 17 to 35 inclusive, that is, chlorine or bromine. Particularly preferred catalysts represented by Formulas I and II are those wherein M is copper, zinc or cadmium.

The organic ligand, as presented by the term L in Formula II, is a trisorgano derivative of an element of Group V-A of the Periodic Table having an atomic number from 15 to 33, i.e., phosphorous or arsine, characterized by each valence of the Group V-A element being satisfied by direct bonding to a carbon atom of the organo moiety. The preferred organic ligands are phosphines represented by the formula $R_3P$ wherein R independently is an organo group having 1 to 20 carbon atoms, preferably 1 to 10 carbon atoms and preferably having only aromatic unsaturation, i.e., R is preferably free from aliphatic carbon-carbon unsaturation. R is therefore saturated aliphatic, including cycloaliphatic, or is aromatic in character, preferably mononuclear aromatic, and is hydrocarbyl, that is, contains only atoms of carbon and hydrogen, or is substituted hydrocarbyl containing, besides atoms of carbon and hydrogen, other atoms such as oxygen and halogen, particularly halogen of atomic number from 9 to 35 inclusive, which atoms are present in functional groups such as alkoxy, aryloxy, carboalkoxy, alkanoyloxy, trihalomethyl or halo.

Illustrative of suitable saturated aliphatic R groups are hydrocarbyl R groups such as methyl, ethyl, propyl, isopropyl, butyl, isooctyl, decyl, lauryl, stearyl, cyclohexyl, cyclopentyl, 3,4-dimethylcyclopentyl and cyclooctyl; as well as substituted hydrocarbyl groups such as 4-bromohexyl, methoxymethyl, 4-carbethoxybutyl and 2-acetoxyethyl. Aromatic R groups include hydrocarbyl aromatic groups such as phenyl, tolyl, xylyl, p-ethylphenyl, m-benzylphenyl and 2,4,6-trimethylphenyl; and substituted hydrocarbyl aromatic R groups including p-methoxyphenyl, m-chlorophenyl, m-trifluoromethylphenyl, p-propoxyphenyl, p-carbethoxyphenyl, 2-ethyl-5-bromophenyl, 3,5,-dibutoxyphenyl and p-acetoxyphenyl and p-phenoxyphenly.

In the $R_3P$ component as defined above, the R moieites are the same or different. Illustrative phosphines of the formula $R_3P$ include tributylphosphine, triphenylphosphine, tris(p-methoxyphenyl)phosphine, tris(p-tolyl)phosphine, tris(p-chlorophenyl)phosphine, hexyldiphenylphosphine, dimethyl(p - phenoxyphenyl)phosphine, dibutyl (m-acetoxyphenyl)phosphine and diphenyl(3-carbethoxybutyl)phosphine. In general, phosphine components wherein the phosphorus substituents are wholly hydrocarbon aromatic, e.g., triarylphosphine, are preferred. Largely because of economic reasons, triphenylphosphine is a particularly preferred tertiary phosphine.

Illustrative of suitable compounds of the formula $MX_n$ are copper chloride, copper bromide, zinc chloride, zinc bromide, zinc iodide, cadmium chloride, cadmium bromide, palladium chloride, platinous chloride and platinous bromide. It should be appreciated that some of these halide salts are available commercially both in anhydrous form or hydrated form, e.g., $CdCl_2 \cdot 2.5H_2O$. In the process of the invention either the anhydrous halide salts or the hydrated halide salts are suitably employed.

Illustrative compounds of Formula II include dichloro-bis(triphenylphosphine)cobalt(II), chloro-tris(triphenylphosphine)copper(I), dibromo-bis(tritolylphosphine)copper(II), dichloro-bis(tributylphosphine)zinc(II), dibromo - bis(triphenylphosphine)zinc(II), dichloro-bis(triphenylphosphine) - cadmium(II), dibromo-bis(triphenylphosphine)cadmium(II), dichloro - bis(triphenylphosphine)palladium(II) and dibromo - bis(triphenylphosphine)platinum(II). The compounds of the Formula II are generally prepared according to procedures known in the art and employed in the process of the invention as the preformed compound. However, it is often advantageous to prepare these compounds in situ by employing in the process the tertiary phosphine component with substantially the stoichiometric amount of the metal halide component as prescribed by the Formula II. For example, it is useful to provide the catalyst as two moles of triphenylphosphine and one mole of $ZnCl_2$ instead of the pre-formed $[P(C_6H_5)_3]_2ZnCl_2$ compound.

The process of the invention is characterized by the requirement of only catalytic quantities of the metal component. Although utilization of larger amounts of the metal component is not detrimental to the process of the invention, amounts larger than about 5 mole percent based on the amine reactant are not generally required. In most instances, amounts of catalysts from about 0.0001 mole percent to about 5 mole percent based on the amine reactant are satisfactory, although amounts from 0.01 mole percent to about 0.5 mole percent are preferred.

It has been found that the metal compounds of the process of the invention do not catalyze the hydrogenation of carbon dioxide to carbon monoxide under the temperatures and hydrogen pressures of the process. Although it is not desired to be bound by any particular theory, it is considered likely, in view of the non-formation of any carbon monoxide per se, that the metal compound undergoes chemical transformation during the course of the reaction involving coordination and/or bonding to carbon dioxide or species derived therefrom so that the carbon of carbon dioxide becomes incorporated into the formamide product as the carbamyl carbon, i.e.,

without the intermediate formation of carbon dioxide reduction products such as CO which are not coordinated or bonded to the metal catalyst. It is also apparent that the process of the invention converts carbon dioxide and an amine to a formamide product by converting carbon dioxide into a carbamyl carbon, which displays the same formal oxidation state of carbon as the carbon atom of carbon dioxide.

*The amine reactant.*—The process is broadly applicable to any primary or secondary hydrocarbon amine. One class of suitable amines are primary and secondary aliphatic hydrocarbon amines represented by the Formula III:

wherein R' is alkyl, cycloalkyl or aralkyl of up to 10 carbon atoms, preferably of up to 7 carbon atoms, and R" is R' or H, with the proviso that when R" is R', the two R' groups taken together may be a divalent hydrocarbyl moiety which together with the nitrogen atom forms an otherwise carbocyclic ring system of a cyclic amine, e.g., piperidine.

The suitable R' groups include the methyl, ethyl, isopropyl, the various isomeric butyl, pentyl, hexyl, octyl and the like alkyl groups; the cyclopentyl, cyclohexyl and the like cycloalkyl groups; and the benzyl, phenylethyl, p-methylbenzyl and the like aralkyl groups.

In those amines wherein the R' and R" represent a divalent radical, it is preferred that the divalent radical is a group with from 4 to 5 carbon atoms in the chain thereof, as in the case of the tetramethylene and pentamethylene groups. Exemplary of such amines are piperidine, pyrrolidine and alkyl-substituted pyrrolidines.

Illustrative primary amines represented by the Formula III, e.g., when R" is H, include methylamine, ethylamine, isopropylamine, n-butylamine, cyclohexylamine, benzylamine, and 2-phenylethylamine. Illustrative secondary dihydrocarbyl amines represented by the Formula III, e.g., when R" is R', include dimethylamine, methylethylamine, diethylamine, methyl-n-butylamine, ethylbenzylamine and cyclohexylbenzylamine. Largely because of their economy and ease of preparation, the lower alkyl amines, especially secondary dialkyl amines having up to 6 carbon atoms, are preferred for use in the process of the invention.

*Other reaction components.*—The process of the invention comprises contacting the amine with carbon dioxide and hydrogen in the presence of the catalyst. Commercially available grades of $H_2$ and $CO_2$ materials of reasonable purity are usually satisfactory. Both the carbon dioxide and hydrogen are generally provided in amounts in excess of the amount of amine reactant and initial partial pressures of from about 200 p.s.i.g. to about 800 p.s.i.g. of $H_2$ and $CO_2$ are satisfactory, although partial pressures of from about 300 p.s.i.g. to 600 p.s.i.g. are preferred.

The process of the invention is conducted in the presence or absence of a reaction diluent. In the modification wherein diluent is employed, diluents that are suitable are those capable of dissolving the reactant and catalyst components, and are inert to the reactants and the products prepared therefrom. Exemplary diluents include saturated aliphatic and cycloaliphatic hydrocarbons such as heptane, isooctane, cyclohexane, methylcyclopentane and aromatic hydrocarbons such as benzene, toluene and the isomeric xylenes. A particularly preferred class of diluents for use in the process of the invention comprises the aromatic hydrocarbons, especially benzene.

*The reaction conditions.*—The process of the invention is conducted by any of a variety of procedures. In one modification, the amine reactant, catalyst, a mixture of carbon dioxide and hydrogen, and any diluent employed are charged to an autoclave or similar pressure reactor for operation in a batchwise manner. In another modification, reaction is effected in a continuous operation as by contacting the entire reaction mixture during passage through a tubular reactor. In yet another modification, which is the preferred modification, the carbon dioxide is added to the remaining reaction mixture components subsequent to the addition of the hydrogen, and the resulting mixture is maintained at reaction temperature and pressure until completion of the reaction. In any modification, the reaction is conducted at elevated temperature. Suitable reaction temperatures vary from about 50° C. to about 250° C. with best results being obtained through utilization of reaction temperatures from about 100° C. to about 175° C. Although the initial reactant pressures described above will decrease with reaction time, the total reaction pressures remain sufficient to maintain a substantial portion of the amine reactant and reaction diluent in the liquid phase.

Subsequent to the reaction, the reaction mixture is separated by conventional means such as fractional distillation, selective extraction, gas-liquid chromatography and the like.

*The formamide product.*—The hydrocarbon formamide product is represented by the Formula IV:

wherein the terms R' and R" are as previously defined. The hydrocarbon formamide product formed by reaction of secondary amines in accordance with the process of the invention is essentially exclusively the N,N-dihydrocarbyl formamide, e.g., n-butylethylamine gives the corresponding N-n-butyl-N-ethylformamide and diethylamine gives N,N-diethylformamide. Reaction of primary hydrocarbon amines produces principally a N-hydrocarbyl formamide product, e.g., ethylamine gives N-ethylformamide as the major product.

The hydrocarbon formamide products of the invention have etstablished utility and some are chemicals of commerce. For example, N,N-dimethylformamide is a commercial solvent of established utility, e.g., as a solvent for polyacrylonitrile fibers as disclosed by U.S. 2,404,713 of Houtz, issued July 23, 1946. N,N-dimethylformamide and other lower alkyl formamides produced in the process of the invention are also useful as catalysts and solvents in the polymerization of isocyanates such as tolylene diisocyanate as disclosed by German Pat. 1,105,155 of Hintzenstern, issued Apr. 20, 1955, and as extractants in the recovery of acetylene from ethylene gas streams as disclosed by British Pat. 585,814 of Imperial Chemical Industries Ltd., issued Feb. 25, 1947.

To further illustrate the improved process of the invention, the following examples are provided. It should be understood that the details thereof are not to be regarded as limitations, as they may be varied as will be understood by one skilled in this art.

EXAMPLE I

A series of runs employing dimethylamine, carbon dioxide and hydrogen in the presence of a variety of metal halide compounds were conducted. In runs 1–4, 400 p.s.i.g. of carbon dioxide was added to a sample of the indicated metal halide compound, about 6 g. of dimethylamine, 15 ml. of benzene and 400 p.s.i.g. of hydrogen, and the resulting mixture was contacted at the indicated temperature in an autoclave for about 17 hours. Runs 5 and 6 were carried out in a similar manner, except that in run 5 the $CdCl_2[P(C_6H_5)_3]_2$ compound was prepared in situ with 0.15 g. of triphenylphosphine and 0.25 g. of cadmium chloride and in run 6 the $PdCl_2[P(C_6H_5)_3]_2$ was prepared in situ with 0.65 g. of triphenylphosphine and 0.25 g. of palladium chloride. The metal halide compound employed, reaction temperature, and moles of dimethylformamide formed per mole of metal compound are provided in Table I. In each case the selectivity to dimethylformamide based on dimethylamine conversion was essentially 100%. Mass spectroscopic analysis of the gas phase at the end of the reaction period showed no carbon compounds other than dimethylamine, dimethylformamide, carbon dioxide and benzene.

EXAMPLE II

By a procedure similar to that of Example I, a mixture of 3 g. of methylamine, 0.25 g. of $CdCl_2 \cdot 2.5H_2O$, 15 ml. of benzene, 400 p.s.i.g. of carbon dioxide and 400 p.s.i.g. of hydrogen was contacted in an autoclave at a temperature of 190° C. for about 17 hours. Analysis of the reaction mixture by gas-liquid chromatography and mass spectroscopy showed that a good yield of N-methylformamide was obtained.

EXAMPLE III

To illustrate that carbon dioxide is not reduced with hydrogen to carbon compounds of lower oxidation state in carbon in the presence of the metal compounds employed in the process of the invention, the catalytic hydrogenation of carbon dioxide was attempted with zinc bromide as catalyst. Thus, a mixture of 0.25 g. of zinc bromide, 10 ml. of benzene, 400 p.s.i.g. of carbon dioxide and 400 p.s.i.g. of hydrogen was contacted in an autoclave at 125° C. for 17 hours by a procedure similar to that of Example I. Analysis of the gaseous and liquid phases of the reaction mixture by mass spectroscopy and gas-liquid chromatography showed the absence of any carbon compounds other than carbon dioxide and the benzene solvent.

The use of cadmium chloride also failed to effect catalytic hydrogenation of carbon dioxide under the reaction conditions of the process of the invention.

EXAMPLE IV

By a procedure similar to that of Example I, a mixture of 6.0 g. of dimethylamine, 0.25 g. of cadmium chloride, 10 ml. of benzene, 400 p.s.i.g. of carbon dioxide and 400 p.s.i.g. of hydrogen was contacted in an autoclave at 125° C., for 17 hours. For comparison, another experiment was performed under identical conditions except that the carbon dioxide and hydrogen were replaced with 800 p.s.i.g. of carbon monoxide. It was found that about twice as much dimethylformamide was produced by employing carbon dioxide and hydrogen as by employing carbon monoxide alone.

We claim as our invention:

1. The process of producing hydrocarbon formamide represented by the formula

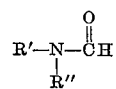

wherein R' and R" are defined hereinbelow by intimately contacting a hydrocarbon amine represented by the formula:

TABLE I

| Run: | Metal compound | Grams $(CH_3)_2NH$ | Temp., °C. | Moles dimethyl formamide/ mole metal compounds |
|---|---|---|---|---|
| 1 | $CuCl[P(C_6H_5)_3]_3$ (0.5 gram) | 6.0 | 100 | 7.6 |
| 2 | $ZnBr_2$ (0.25 gram) | 6.0 | 125 | 2 |
| 3 | do | 6.0 | 155 | 24.6 |
| 4 | $CdCl_2 \cdot 2.5H_2O$ (0.25 gram) | 6.1 | 125 | 11 |
| 5 | $CdCl_2[P(C_6H_5)_3]_2$ (0.4 gram) | 6.1 | 125 | 10.5 |
| 6 | $PdCl_2[P(C_6H_5)_3]_2$ (0.9 gram) | 5.4 | 125 | 1.7 |

To illustrate that the metal compounds employed in the process of the invention generally possess extremely high catalytic activity, a portion of the reaction mixture from run 1 containing approximately 0.2 g. of the copper phosphine compound was contacted with an additional 6.0 g. of dimethylamine in the presence of 400 p.s.i.g. carbon dioxide and 400 p.s.i.g. of hydrogen. It was found that an additional 900 moles of dimethylformamide were produced per mole of the copper.

where R' is alkyl of up to 10 carbon atoms and R" is R' or hydrogen and (b) an excess of carbon dioxide at an initial partial pressure of from about 200 p.s.i.g. to about 800 p.s.i.g. and an excess of hydrogen at an initial partial pressure of from 200 p.s.i.g. to about 800 p.s.i.g., in the presence of a catalytic amount of a halogen-containing metal compound selected from compounds of the formulas $$MX_n \text{ or } L_{4-n}MX_n$$

wherein M is copper, zinc, cadmium, or palladium, X is halogen of atomic number from 9 to 53 inclusive, $n$ is a whole number from 1 to 2 inclusive and L is a triarylphosphine represented by the formula $R_3P$ wherein R is a mononuclear carbocyclic aromatic group of up to 10 carbon atoms at a temperature of from about 50° C. to about 250° C.

2. The process of claim 1 wherein the carbon dioxide is present in an initial partial pressure of from about 300 p.s.i.g. to about 600 p.s.i.g. and the hydrogen is present in an initial partial pressure of from about 300 p.s.i.g. to about 600.

3. The process of claim 2 wherein M is copper, zinc or cadmium.

4. The process of claim 3 wherein R' is alkyl of up to 7 carbon atoms and R" is R'.

5. The process of claim 4 wherein the halogen-containing compound is represented by $MX_n$ wherein X is halogen of atomic number from 17 to 35 inclusive.

6. The process of claim 5 wherein the amine is dimethylamine.

7. The process of claim 4 wherein the halogen-containing compound is represented by $L_{4-n}MX_n$ wherein X is halogen of atomic number from 17 to 35 inclusive.

8. The process of claim 7 wherein the compound $L_{4-n}MX_n$ is prepared in situ by admixing substantially stoichiometric amounts of L and $MX_n$.

9. The process of claim 7 wherein L is triphenylphosphine.

10. The process of claim 9 wherein the amine is dimethylamine.

References Cited

"DMF," R. S. Kittila (1967) E. I. duPont, Wilmington, Del., p. 217.

ALEX MAZEL, Primary Examiner

RAYMOND V. RUSH, Assistant Examiner

U.S. Cl. X.R.

260—294.7, 326.5, 562